US009068689B2

(12) United States Patent
Hickle et al.

(10) Patent No.: US 9,068,689 B2
(45) Date of Patent: Jun. 30, 2015

(54) APPARATUS AND SYSTEM TO MOUNT OBJECTS IN PROXIMITY TO CEILING STRUCTURE

(71) Applicants: William E. Hickle, Rolla, MO (US); Mark D. Hickle, Rolla, MO (US)

(72) Inventors: William E. Hickle, Rolla, MO (US); Mark D. Hickle, Rolla, MO (US)

(*) Notice: Subject to any disclaimer, the term of this patent is extended or adjusted under 35 U.S.C. 154(b) by 0 days.

(21) Appl. No.: 13/965,426

(22) Filed: Aug. 13, 2013

(65) Prior Publication Data

US 2013/0320176 A1    Dec. 5, 2013

Related U.S. Application Data

(62) Division of application No. 12/931,604, filed on Feb. 3, 2011, now Pat. No. 8,820,686.

(60) Provisional application No. 61/337,518, filed on Feb. 4, 2010.

(51) Int. Cl.
E04B 9/20 (2006.01)
F16M 13/02 (2006.01)
E04B 9/00 (2006.01)
E04B 9/18 (2006.01)
F16L 3/24 (2006.01)
A62C 35/68 (2006.01)
F16L 3/12 (2006.01)

(52) U.S. Cl.
CPC ............... *F16M 13/027* (2013.01); *F16L 3/12* (2013.01); *E04B 9/006* (2013.01); *E04B 9/20* (2013.01); *E04B 9/18* (2013.01); *F16L 3/24* (2013.01); *A62C 35/68* (2013.01); *F16L 3/1215* (2013.01)

(58) Field of Classification Search
CPC ............. A62C 35/68; E04B 9/18; E04B 9/20; E04B 9/006; F16L 3/24; F16M 13/027
USPC ............ 248/65, 200.1, 343, 72, 75, 340, 342, 248/344
See application file for complete search history.

(56) References Cited

U.S. PATENT DOCUMENTS

| | | | | |
|---|---|---|---|---|
| 2,297,869 A | * | 10/1942 | Biller | 248/343 |
| 2,854,205 A | * | 9/1958 | Kruger | 248/343 |
| 3,035,672 A | * | 5/1962 | Tuten et al. | 52/656.8 |
| 3,459,399 A | * | 8/1969 | Everson | 248/343 |
| 3,599,921 A | * | 8/1971 | Cumber | 248/317 |
| 3,998,419 A | * | 12/1976 | Semmerling | 248/323 |
| 4,630,423 A | * | 12/1986 | Lind | 52/506.06 |
| 4,720,946 A | * | 1/1988 | Pagliarello | 52/39 |
| 4,905,952 A | * | 3/1990 | Pinquist | 248/317 |
| 5,044,582 A | * | 9/1991 | Walters | 248/57 |

(Continued)

FOREIGN PATENT DOCUMENTS

DE    202007002252 U1 *  5/2007
JP     2003155803 A  *  5/2003

*Primary Examiner* — Terrell McKinnon
*Assistant Examiner* — Eret McNichols
(74) *Attorney, Agent, or Firm* — Douglas E. Warren

(57) ABSTRACT

A mounting apparatus for automatic fire sprinkler systems and other objects to be securely attached to the structure of a ceiling of a building, and additionally relates to a mounting clamp for securely gripping the tee of a suspended ceiling in order to mount an object to be held in proximity to the ceiling and a mounting clamp for mounting the sprinkler head of a fire protection system or other type of water system. The system provides means for more rigidly mounting various components of the system to the existing piping and ceiling structure found at an installation location.

6 Claims, 6 Drawing Sheets

(56) References Cited

U.S. PATENT DOCUMENTS

| | | | |
|---|---|---|---|
| 6,260,810 B1* | 7/2001 | Choi | 248/65 |
| 6,341,466 B1* | 1/2002 | Kehoe et al. | 52/712 |
| 6,811,130 B1* | 11/2004 | Oh | 248/343 |
| 7,255,315 B2* | 8/2007 | Oh | 248/342 |
| 7,264,214 B2* | 9/2007 | Oh | 248/342 |
| 7,506,845 B2* | 3/2009 | Oh | 248/73 |
| 7,730,690 B2* | 6/2010 | Miller et al. | 52/506.05 |
| 8,109,482 B2* | 2/2012 | Oh | 248/342 |
| 8,336,843 B2* | 12/2012 | Gulbrandsen et al. | 248/317 |
| 2005/0139743 A1* | 6/2005 | Shim | 248/342 |
| 2011/0011023 A1* | 1/2011 | Gulbrandsen et al. | 52/506.07 |
| 2012/0097406 A1* | 4/2012 | Silcox et al. | 169/51 |
| 2013/0161462 A1* | 6/2013 | Haddock | 248/237 |

* cited by examiner

APPARATUS AND SYSTEM TO MOUNT OBJECTS IN PROXIMITY TO CEILING STRUCTURE

CROSS REFERENCE TO RELATED APPLICATIONS

This application is a divisional application related to U.S. Nonprovisional application Ser. No. 12/931,604. This application claims all applicable benefits to that application and the entire disclosure of that application is hereby incorporated by reference herein.

STATEMENT REGARDING FEDERALLY SPONSORED RESEARCH

Not Applicable.

BACKGROUND OF THE INVENTION

Automatic fire sprinkler components, systems, and other objects sometimes need to be installed securely attached to the existing structure of a ceiling of a building. Although various other inventions for accomplishing this task exist, there is a need for a mounting system having components that can provide a more rigid attachment and mounting of the fire sprinkler system components to the structure of the building.

SUMMARY OF THE INVENTION

In accordance with the various embodiments of the present invention, this invention relates to a component mounting system for automatic fire sprinkler systems and other objects to be securely attached to the structure of a ceiling of a building, and additionally relates to a mounting device for securely gripping the tee of a suspended ceiling in order to mount an object to be held in proximity to the ceiling. The component mounting system provides means for more rigidly mounting various components of the system to the existing piping and ceiling structure found at an installation location.

DESCRIPTION OF THE DRAWINGS

In the accompanying drawings which form part of the specification.

Corresponding reference numerals indicate corresponding steps or parts throughout the several figures of the drawings.

Figure 1:
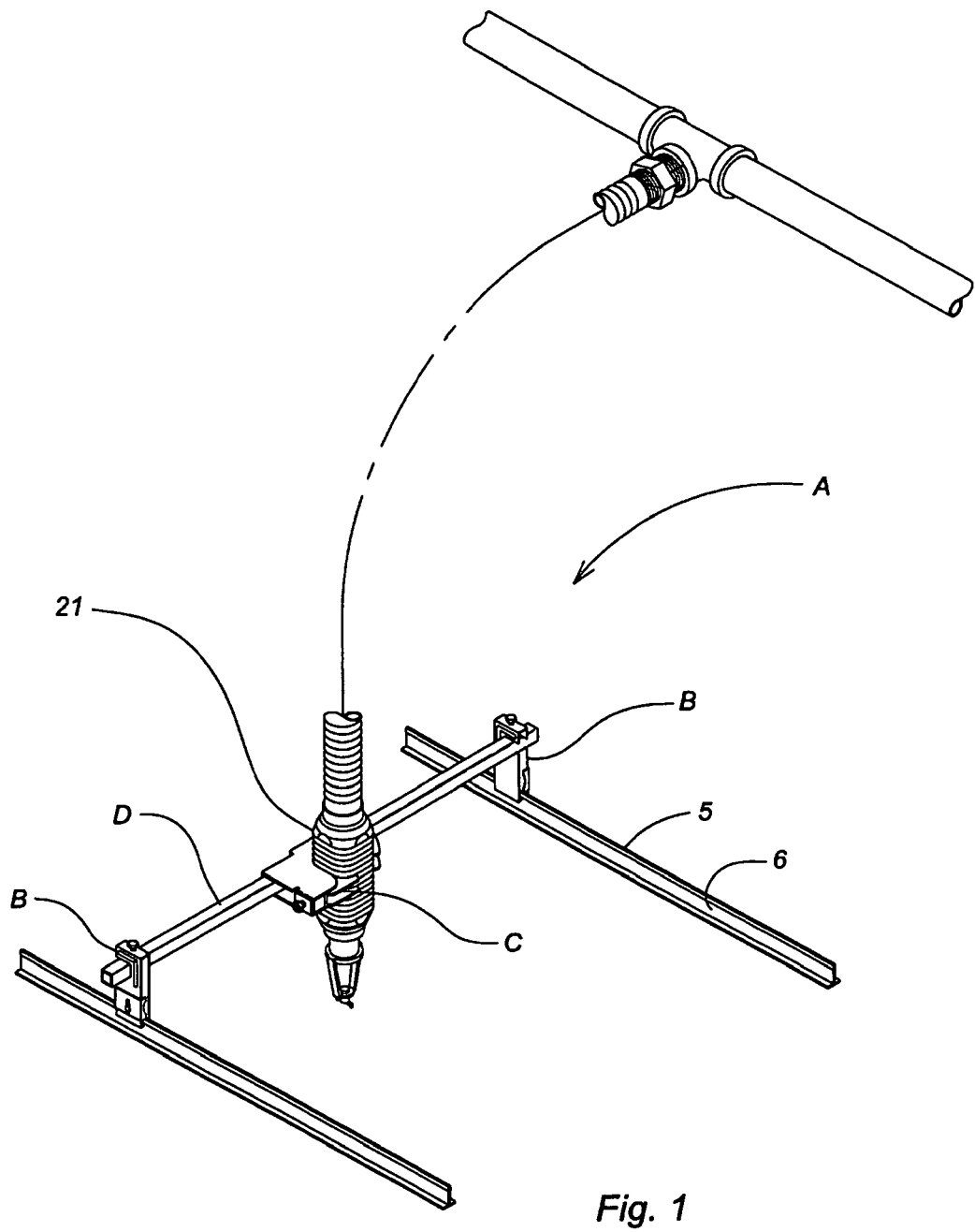
FIG. 1 shows a perspective view of one embodiment of the present invention.

While one embodiment of the present invention is illustrated in the above referenced drawings and in the following description, it is understood that the embodiment shown is merely one example of a single preferred embodiment offered for the purpose of illustration only and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF A PREFERRED EMBODIMENT OF THE INVENTION

A preferred embodiment of the present invention is illustrated in drawings and figures contained within this application. More specifically, a preferred embodiment of the present invention includes a component mounting system for securely gripping the tee of a suspended ceiling in order to mount a sprinkler head to be held in proximity to the ceiling.

Suspended ceilings typically employ a rectangular grid system that supports lay-in ceiling panels or tiles. The grid is made up of regularly suspended ceiling tees intersecting at right angles. The general shape of the suspended ceiling tees is an inverted "T." The present mounting system includes a tee bulb clamp, a reducer clamp, and a support bar that, when used together, generate a component mounting system that mounts automatic fire extinguishing components to the rectangular grid system used to support a suspended ceiling. It will be understood that the tail of the inverted tee is identified herein as the "bulb" of the tee.

In one embodiment of a component mounting system A is disclosed. In that embodiment, a tee bulb clamp attaches to the suspended ceiling tee 6 as shown. It is noted that certain embodiments of the present invention include a tee bulb clamp having an adjustable clamping plate that grips a portion of the suspended ceiling tee above and below the tee bulb. It is appreciated that other similar tee clamps grip the bulb either above or below the bulb, but not both.

It has been found that, to hold a fixture such as a sprinkler head or other fixture in a more fixed position relative to the ceiling tile, it is preferred that the tee bulb clamp firmly grip the tee runner without damaging or penetrating the tee. These previous attachment devices allow excessive rotational movement of the attachment device in relation to the tee, because the mounting devices fail to securely grip the tee from both immediately above and immediately below the bulb of the top portion of the tee. Because the height of the bulb of the tee varies from one make and model of tee to another, it is desirable to have a device than can adjust to tightly grip the particular tee bulb involved. The present invention solves this problem with an adjustable clamping plate, making it possible to economically and securely grip the tee both immediately above and immediately below the bulb. This eliminates or greatly reduces rotational movement of the mounting device with a minimum amount of gripping force exerted upon the tee.

Generally, reducer clamps provide a means of securely attaching an object such as a sprinkler reducer or other fixture to a support beam in order to mount the fixture in proximity to the ceiling. A variety of attachment devices are already in existence to attach reducers to support beams in order to hold the reducer in a fixed location relative to a ceiling. Most of those other designs do not result in the best method of positioning and gripping the reducer portion of a sprinkler head. The reducer clamp in certain preferred embodiments of the present invention offer a more acceptable method of positioning and gripping the reducer portion of a sprinkler head and includes a single screw that closes the latch in place and uses only one moving part, the latch, in order to firmly attach the reducer in place.

Referring now to FIG. 1, one embodiment of the Component Mounting System A is shown. In this embodiment, the component mounting system A comprises mounting clamps B, a reducer clamp C, and a mounting component D for the mounting clamps. In the present embodiment the mounting component D is a mounting bar D, however, in alternative embodiments the mounting component may be any component that is structurally sound enough to support the mounting clamp C in a desired application.

In the present embodiment the mounting clamps C are tee bulb clamps B that are mounted near the ends of the mounting bar D and the reducer clamp C is disposed on the mounting bar D in a position intermediate to the two tee bulb clamps B. It is understood that the final location of the reducer clamp C on the mounting bar D is determined by the desired location of a fire sprinkler reducer 21. It is also understood that while the present embodiments shows the mounting bar D to be a square tube, in alternative embodiments of the present invention the mounting bar can also have a rectangular shape, a flat bar shape, a circular shape, or any other shape as long as the tee bulb clamp B and the reducer clamp C are configured to allow the clamping of the either the tee bulb clamp or the reducer clamp to whatever configuration has been selected for the mounting bar D.

The installation of the Component Mounting System A can be accomplished in a number of ways. In one embodiment, the two tee bulb clamps B and the reducer clamp C are individually installed onto the mounting bar D at the general location selected for installation of the Component Mounting System A. This is to say, the assembly of the Component Mounting System A is done near the arrangement structure of the suspended ceiling tees 6. In alternative embodiments, both of the two tee bulb clamps B and the reducer clamp C are preinstalled onto the mounting bar D prior to locating that assembly within the structural arrangement of the suspended ceiling tees 6. This type of preassembly can be very useful in reducing the time and the cost of assembling the components of the Component Mounting System A. It will be appreciated that in one embodiment of the reducer clamp C, the reducer clamp includes a cam portion that allows the assembler to preposition the reducer clamp onto the mounting bar D prior to lifting the preassembled Component Mounting System A into the suspended ceiling structure. In that embodiment, the cam portion of the reducer clamp C contacts the mounting bar D when the reducer clamp is opened to thereby retain the reducer clamp in a set location on the mounting bar before installation. After the placement of a fire sprinkler reducer 21 into the reducer clamp C, the closing of the reducer clamp disengages the cam portion of the reducer clamp to substantially release the grip of the cam portion from the mounting bar D.

In at least one of the preferred embodiments noted above, the tee bulb clamp B can be as shown and described in FIGS. 1 through 4.

Figure 2:
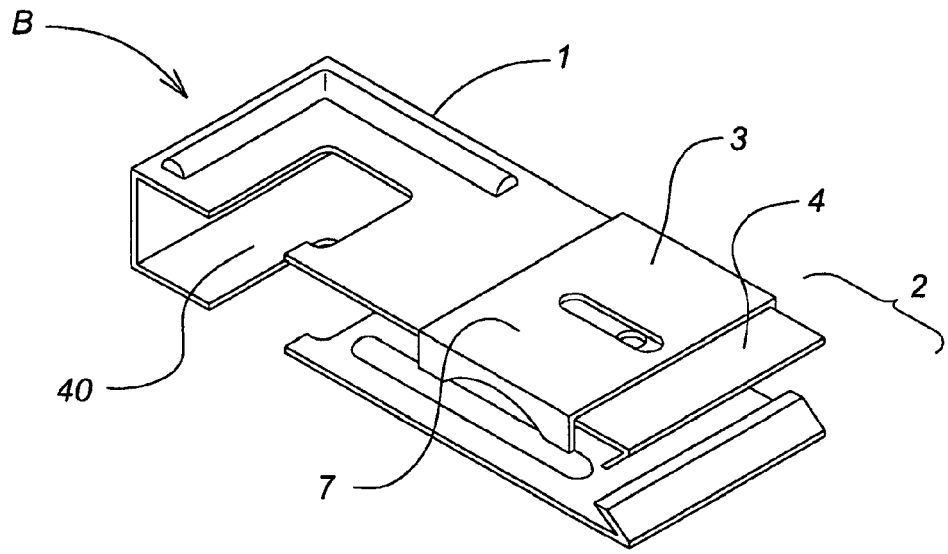
FIG. 2 shows a perspective view of a tee bulb clamp for one embodiment of the present invention.
Figure 3:
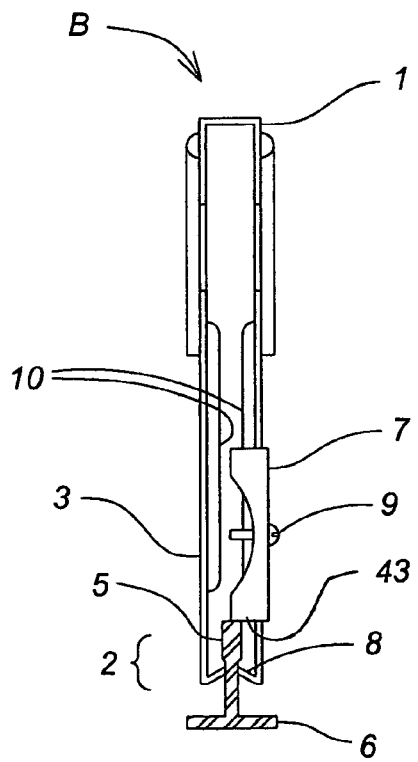
FIG. 3 shows a front view of a tee bulb clamp for one embodiment of the present invention.
Figure 4:
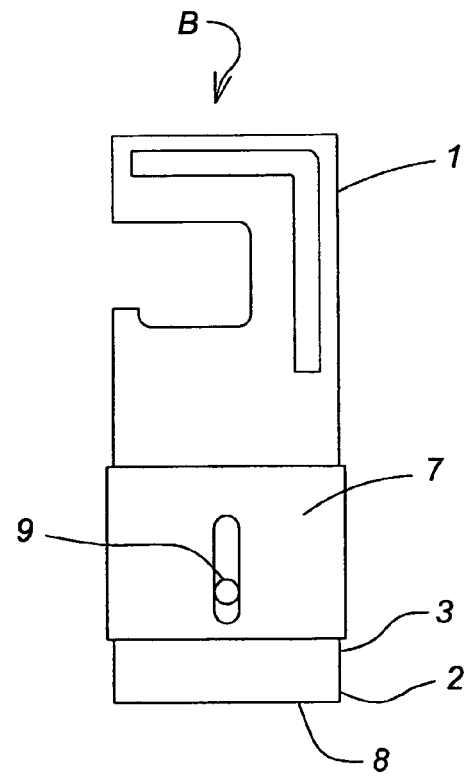
FIG. 4 shows a side view of a tee bulb clamp for one embodiment of the present invention.
Figure 5:
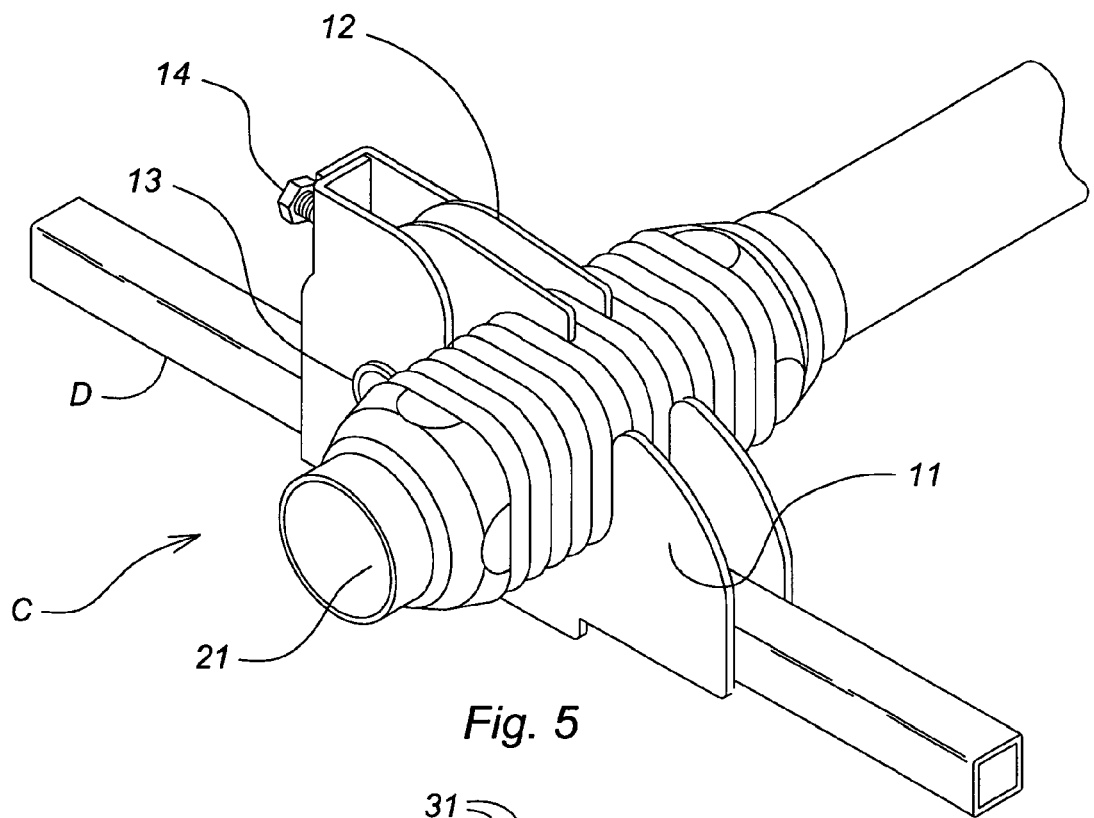
FIG. 5 shows a front perspective view of an installed reducer clamp for one embodiment of the present invention.

Referring now to FIGS. 2 & 3, the embodiment disclosed includes a tee bulb clamp B that comprises a body portion 1, a bracket portion 2, and a clamping plate portion 3. The tee bulb clamp B is configured to be attachable to a mounting component that can be found in the area in which the tee bulb clamp is to be installed. For example, the mounting component may be a rod, a bar, an I-beam, or any other structural member located near the tee bulb clamp B that can provide a stable mounting point that is strong enough to hold the tee bulb clamp sufficiently to allow the tee bulb clamp to assist in providing support for any component being supported by the tee bulb clamp.

It is also understood that while the body portion 1 of the present embodiment of the tee bulb clamp B is substantially channel-shaped, it is not necessary that a channel shape be used. For example, the body portion 1 may also be in the shape of a plate or a bar and still remain within the scope of the present invention.

In the present embodiment, the mounting component is the T-bar used as the structural grid that is installed to support a suspended ceiling system. In this embodiment, the bracket portion 2 is generally located near a bottom end 4 of the body portion 1 of the tee bulb clamp B. The bracket portion 2 includes a set of gripping edges 8 that are used to grip the tee bulb 5 immediately below the lower portion of the tee bulb of the suspended ceiling tee 6 to allow the tee bulb clamp B to grip the tee 6.

In the present embodiment, a mounting attachment element in the form of a cutout area 40 is in the upper area of the flanges 10 of the body 1 and is sized to allow the mounting bar D (FIG. 1) to be installed into the cutouts to position and hold the mounting bar D or other item above or near the ceiling grid. It is also understood that while the present embodiments shows the cutout 40 configured to match a mounting bar D that is in the shape of a square tube, in alternative embodiments of the tee bulb clamp B, the cutout 40 may also have a rectangular shape, a flat bar shape, a circular shape, or any other shape as long as the cutout 40 is configured to match the shape of the mounting bar D selected for a particular application. Additionally, if the tee bulb clamp B is not installed onto the mounting bar D, but on some alternative component of a ceiling installation upon which the tee bulb clamp can be mounted, the cutout 40 in that embodiment will be configured as needed to fit the shape of the other alternative component of the ceiling installation.

Finally, in yet other embodiments, the tee bulb clamp B does not have any cutout at all. In these other embodiments, the tee bulb clamp B includes a mounting attachment element that provides a sufficient method of attaching the tee bulb clamp B to any mounting component that can provide a sufficiently stable attachment point for the tee bulb clamp. For example, the tee bulb clamp B may include an additional clamping element dedicated to clamping the tee bulb clamp to a mounting component having a flange or flat surface capable of interfacing with the additional clamping element. In yet other similar embodiments, the tee bulb clamp B can be fastened to a mounting component with a fastener such as a screw, a nut, a rivet or any other similar fastening device as long as the selected fastening device sufficiently attaches the tee bulb clamp to the mounting component.

In the present embodiment, the tee bulb clamp B (FIG. 2) also includes a clamping plate 7 that is slideably attached to the body portion 1 by a clamping device 40 that can have a screw, cam, or other attachment mechanism in such a way that the clamping plate raises or lowers to more firmly grip the upper portion of the tee bulb 5 (FIG. 3) of the suspended ceiling tee 6. The set of gripping edges 8 work in addition to the clamping plate to enhance the grip of the tee bulb clamp on the ceiling tee 6. It is noted that whether the body portion 1 is either a channel shape, a bar shape, or a flat plate shape, the clamping plate 7 is still configured to match the body portion as needed to allow the clamping plate to be slideably attached to the body portion.

Installation of one preferred embodiment of the tee bulb clamp B (FIG. 3 & FIG. 4) is accomplished by first ensuring that the clamping plate 7 is in a loosened state that allows the clamping plate to move up and down on the body portion 1. In alternate embodiments, the clamping plate 7 can be adjusted away from the tee bulb 5 before the tee bulb clamp B is positioned around the tee bulb of the ceiling tee 6. In the present embodiment, the tee bulb clamp B is lowered over the ceiling tee 6 causing the clamping plate 7 to make contact with the top edge of the tee bulb 5. As the tee bulb clamp B is further lowered, the tee bulb pushes the lower edge of the clamping plate 7 upward and moves the gripping edges 8 apart to allow the tee 5 to pass between the gripping edges. It is understood that the material used to make the tee bulb clamp B tends to maintain the dimensional relationship between each of the set of gripping edges 8 to resist any force that tends to spread the gripping edges apart.

The tee bulb clamp B is further lowered until the gripping edges 8 pass the lower edge of the tee bulb 5 to allow the gripping edges to move toward each other at a point just below the bottom edge of the tee bulb. Because the set of gripping edges 8 tends to maintain the dimensional relationship, as noted above, that tendency bias the gripping edges to return to their resting position and, in doing so, the gripping edges tend to grasp and retain the lower part of the ceiling tee 6 just below the bulb 5.

After the clamping plate portion 3 is positioned around the tee bulb 5, the clamping plate 7 is positioned toward the tee bulb until it comes into close contact with the tee bulb. The clamping plate 7 is then secured against the body portion 1 of the tee bulb clamp B, and that action results in the retained engagement of the clamping plate against the top edge of the tee bulb 5 and the retentive placement of the two gripping edges 8 against the bottom of the tee bulb 5. The clamping plate 7 is then locked into position by tightening a clamping screw 9 or other locking mechanism such that the clamping plate remains adjacent to the top edge of the tee bulb 5. When installed, the tee bulb clamp B will be held in position in relation on to the tee bulb 5 by the bracing action caused by the pressure of the clamping plate 7 onto the top edge of the tee bulb, and by the clamping action of the two gripping edges 8 against the sides of the tee bulb.

The clamping plate 7 in the present embodiment is in the general shape of a channel. It will be appreciated by those skilled in that art that other shapes may be used while still remaining within the intended scope of the present invention. For example, the clamping plate 7 in alternative embodiments may be L-shaped in which case one flange of the L-shape will be the portion of the clamping plate that comes into contact with the top edge of the tee bulb. Yet other shapes may be used in alternative embodiments as long as the shape selected provides the clamping plate 7 with an element that can be positioned against the top edge of the tee bulb to assist in the stabilization of the tee bulb clamp B when installed onto the tee bulb.

The reducer clamp C of this embodiment of the present invention is shown in FIGS. 5 through 10. The reducer clamp C (FIGS. 5 & 6) includes a body 11, a gripper 12, an axle 13, and a gripper actuator 14.

The body 11 (FIGS. 8 & 9) of the reducer clamp C is in the general shape of a channel having a web 15 and two side flanges 16. The web 15 has an inside surface 17. In certain embodiments, the outside surface 18 of the web 15 includes a set of flaps 19 that protrude away form the outside surface of the web. The two side flanges 16 are shaped to have a throat 20 located near the longitudinal center of each side flange. It is appreciated that each of the two side flanges 16 in this embodiment are mirror images of the other side flange. The throat 20 is generally arcuate and is sized to allow the insertion of the reducer 21 of a sprinkler head for an automatic fire sprinkler system. It is understood that various fire sprinkler systems may have a range of different sizes and shapes of the reducers 21 of the sprinkler head and it is intended that embodiments of the present invention include matching the throat 20 to the size and shape of the reducer 21 as needed to fit the size of the fire sprinkler system with which embodiments of the present invention are used.

Figure 8:
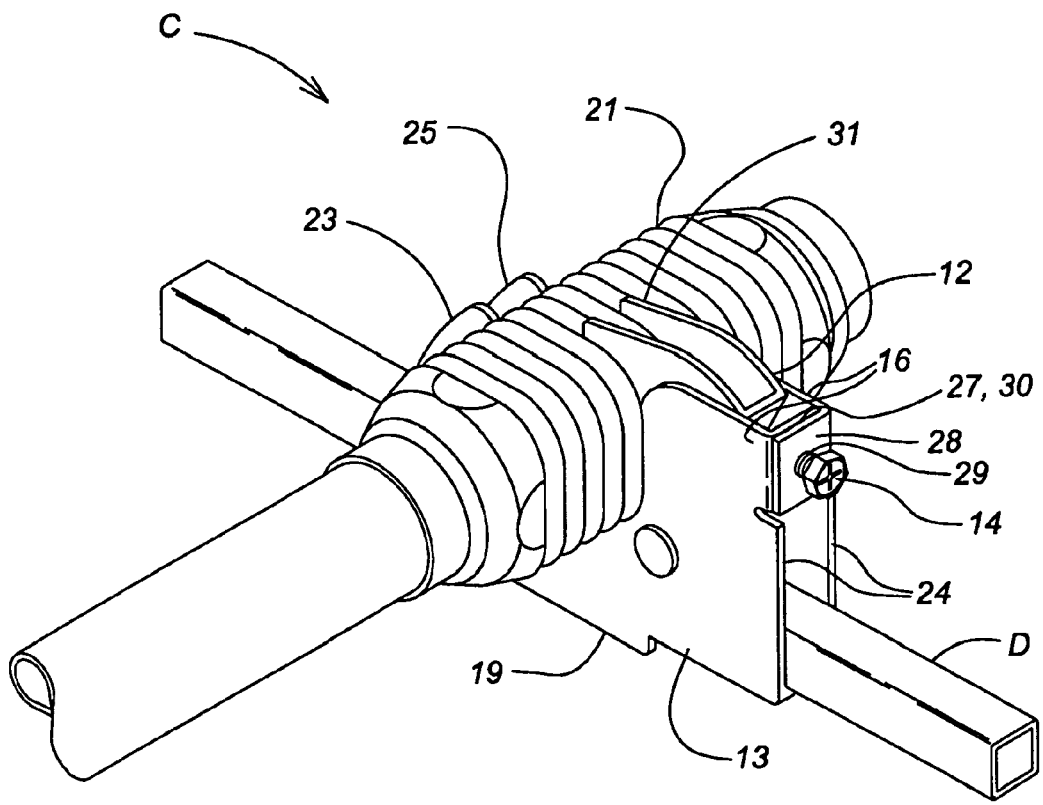
FIG. 8 shows a back perspective view of a reducer clamp with a fire sprinkler reducer head installed for one embodiment of the present invention.
Figure 9:
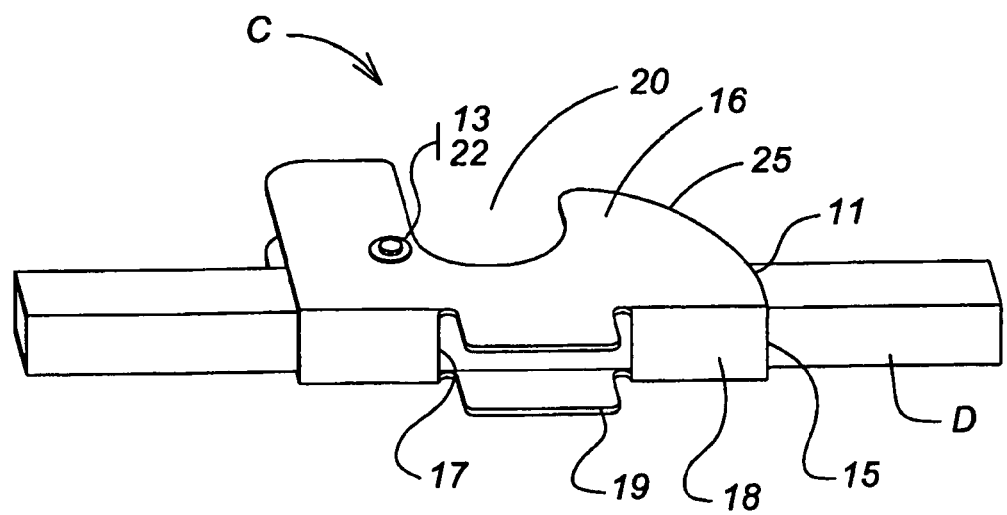
FIG. 9 shows bottom perspective view of a reducer clamp for one embodiment of the present invention.
Figure 10:
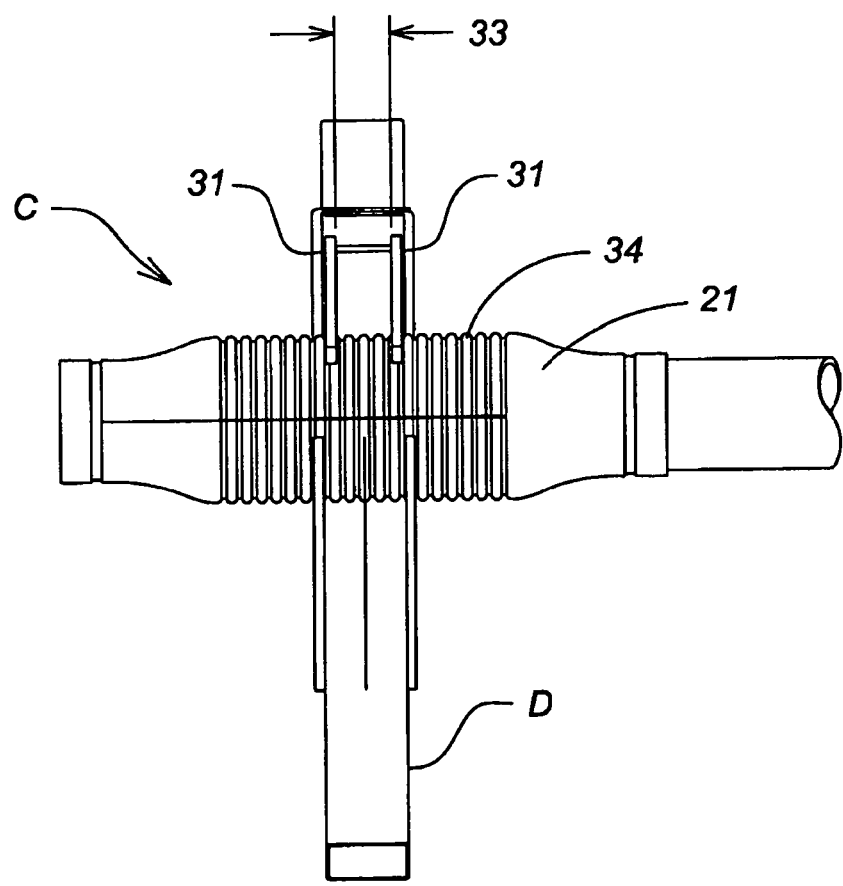
FIG. 10 shows a top view of a reducer clamp with a fire sprinkler reducer head for one embodiment of the present invention.

In the current embodiment, each of the two side flanges 16 has an axle opening 22. The axle opening 22 on each side flange 16 is axially aligned to match the axle opening 22 of the other side flange. A proximal end 23 of each of the side flanges 16 may have a generally arcuate edge 25. The gripper actuator 14 of the present embodiment includes a distal end 24 of each side flange 16 that is generally rectangular in shape and includes two tabs wherein one tab is disposed on the distal end 24 of each of the two side flanges 16. It is understood that the two tabs 26 are configured such that one tab substantially overlaps the other tab as shown in FIG. 8 and such that one tab is an inner tab 27 and the other tab is an outer tab 28. The outer tab 28 has a non-threaded aperture 29 while the inner tab 27 has a threaded aperture 30. The non-threaded aperture 29 and the threaded aperture 30 are generally in axial alignment. It will be appreciated that in alternative embodiments of the present invention, the gripper actuator 14 can include only one tab having a threaded opening. In yet other embodiments, the gripper actuator 14 can incorporate other types of devices that can perform the function of the gripper actuator as long as the device selected is capable of operating the gripper 12 in a manner that allows the gripper to contact the reducer 21.

The gripper 12 (FIG. 6) of the reducer clamp C is also generally channel shaped and includes two gripper flanges 31. Each of the two gripper flanges 31 has an arcuate portion 32 that is sized and configured to match the reducer 21 (FIG. 5) of the sprinkler head of an applicable fire sprinkler system. In certain embodiments of the present invention, there is a distance 33 (FIG. 10) between the gripper flanges 31 that is sized to match the spacing of a set of grooves 34 that can often be found in the reducer 21 of the sprinkler head. When the distance 33 matches the spacing of the set of grooves 34 in the reducer 21, the thickness of the material of the gripper flanges 31 is such as to allow the gripper flanges to generally engage each of the set of grooves in the reducer and thus allow the gripper flanges to more readily grip the reducer to maintain the reducer in a substantially fixed position. In alternative embodiments, there may be one or more gripper flange 31 and each such gripper flange may or may not have an operative relationship to any grooves that may exist on the reducer 21. Each of the two gripper flanges 31 has an axle aperture 35 (FIG. 6) wherein the axle aperture in one gripper flange 31 is axially aligned with the axle aperture of the other gripper flange.

Figure 6:
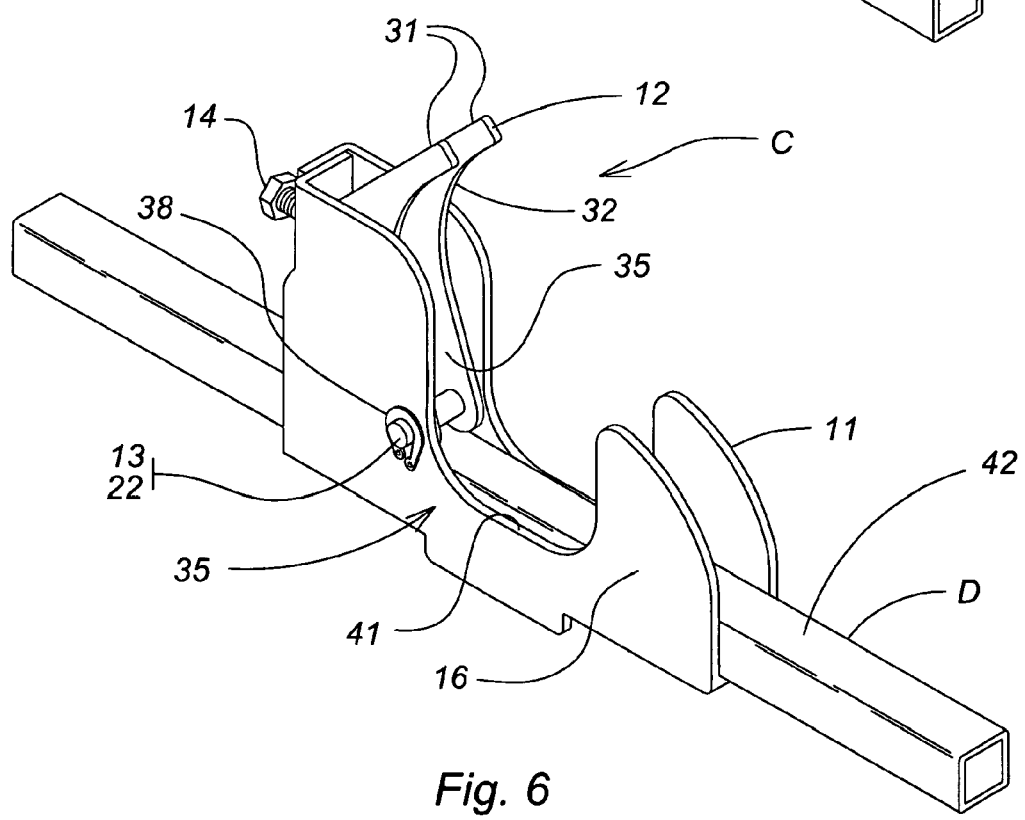
FIG. 6 shows a right perspective view of a reducer clamp for one embodiment of the present invention.
Figure 7:
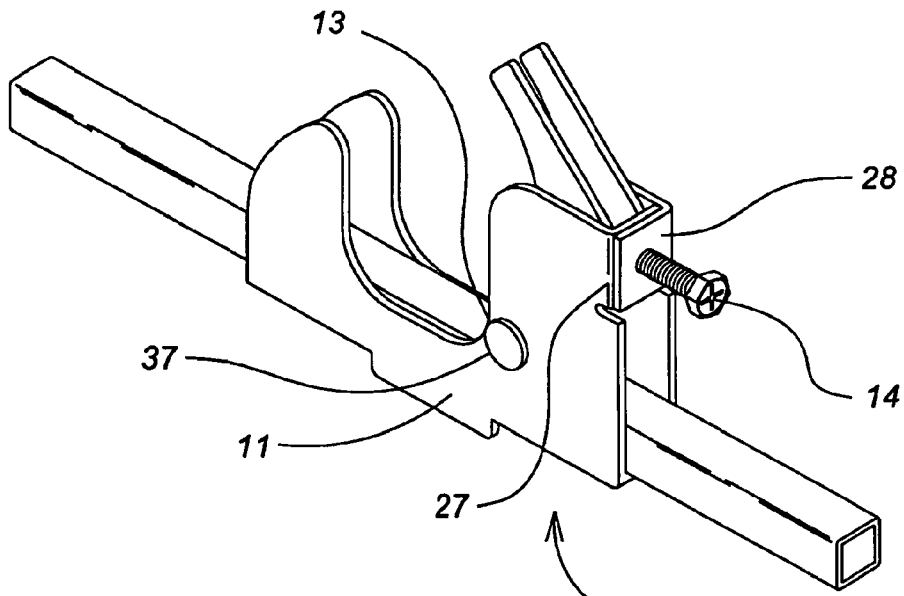
FIG. 7 shows a left perspective view of a reducer clamp for one embodiment of the present invention.

The axle 13 (FIG. 5) of certain embodiments of the present invention is sized and configured to match the two axle apertures 35 (FIG. 6) of the gripper flanges 31 and the two axle openings 22 of the two side flanges 16 of the body 11 of the reducer clamp C. The dimensional relationship between the size of the axle 13 and the size of the axle apertures 35 and the axle openings 22 are such as to allow the gripper flanges 31 to pivot on the axle 13 when the gripper flange is assembled to the body 11 of the reducer clamp C as noted below. It will be appreciated that the axle 13 will include a retention method of some type that acts to inhibit the axle from being unintentionally removed from the reducer clamp C. In the present embodiment, the axle 13 includes a head 37 (FIG. 7) and is retained in assembled position by a snap ring 38 (FIG. 6). In alternative embodiments, the axle 13 can be a single rod that can be held in place in a rivet-like manner with each end of the rod deformed to inhibit the removal of the axle from the reducer clamp C.

The body 11 and the gripper 12 are assembled with an axle 13 to generate the primary part of the reducer clamp C. This assembly includes the positioning of the gripper flanges 31 between the side flanges 16 of the body 11 such that the axle apertures 35 of the two gripper flanges are axially aligned with the two axle openings 22 of the two side flanges. The axle 13 is inserted into both axle apertures 35 and into both axle openings 22 to thereby maintain the gripper flanges 31 in movable position within the channel portion of the body 11 of the reducer clamp C. A clamping actuator 14 is inserted through the non-threaded aperture 29 (FIG. 8) of the outer tab 28 and threaded into the threaded aperture 30 of the inner tab 27 of the body 11.

In the present embodiment, the clamping actuator 14 is a screw or bolt, however it is understood that other types of devices may be used as the clamping actuator while still remaining within the intended scope of the present invention. It is understood that while the gripper 12 of the present embodiment is disposed within the flanges 16 of the body 11 of the reducer clamp C, in alternative embodiments the gripper can be configured to be disposed outside the flanges of the body. In fact, the gripper 12 can be disposed in any relationship with the body 11 of the reducer clamp C so long the gripper remains capable of properly gripping the reducer 21 after installation of the reducer clamp C.

Figure 11:
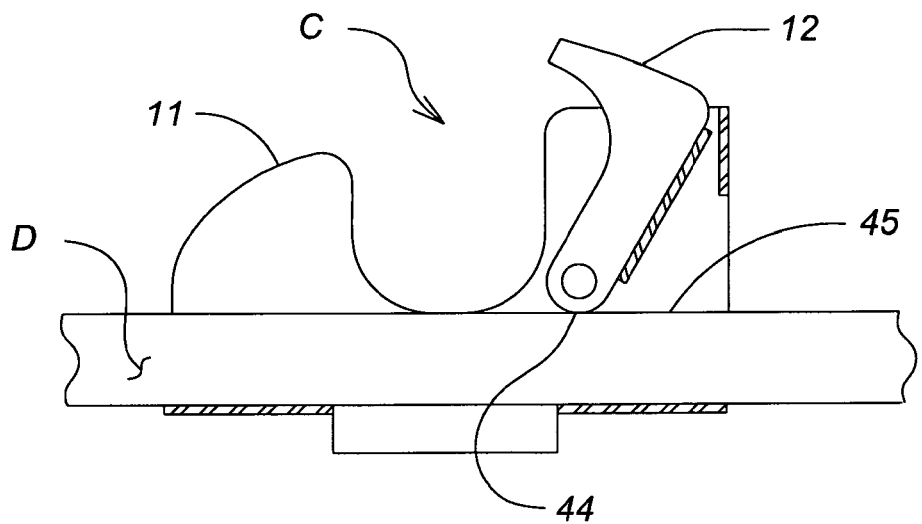
FIG. 11 shows a vertical section view of the reducer clamp with the gripper in an open position for one embodiment of the present invention.
Figure 12:
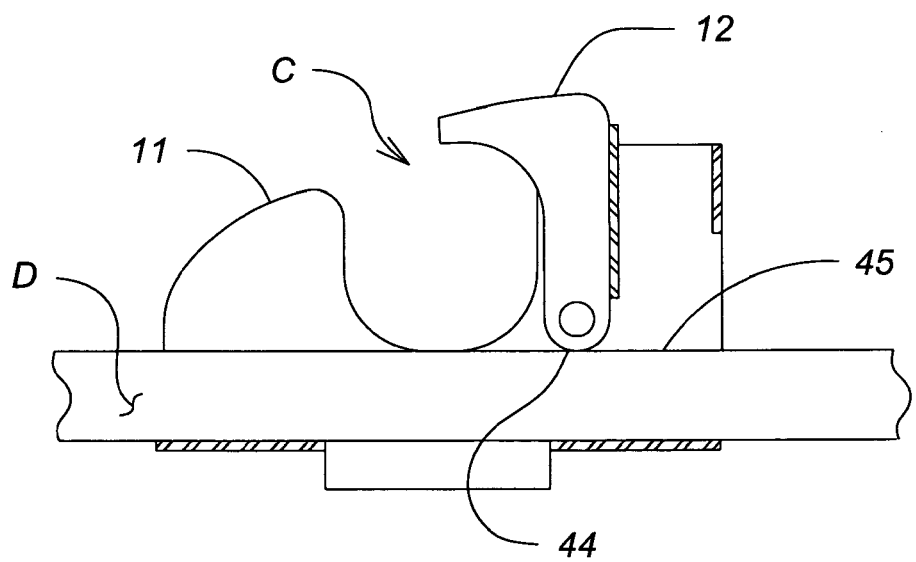
FIG. 12 shows a vertical section view of the reducer clamp with the gripper in a closed position for one embodiment of the present invention.

Certain embodiments of the present invention allow the reducer clamp C (FIGS. 11 & 12) to be locked in a fixed position on a mounting bar D when the reducer clamp is not yet installed onto the mounting grid of the suspended ceiling tees 6. This is accomplished by shaping a lower portion of the gripper 12 such that this portion of the gripper flange includes a cam portion 44. When the gripper 12 is in an open position (FIG. 11), the cam portion 44 presses against the top surface 45 of the mounting bar D to hold the reducer clamp C in place on the mounting bar. When the gripper 12 is in a closed position (FIG. 12), the cam portion 44 does not press on the mounting bar D. The action of the cam portion 44 thus allows the reducer clamp C to be pre-installed at a fixed position on the mounting bar D prior to the final installation of the reducer clamp onto the grid of ceiling tees 6 for the suspended ceiling. Because most sprinkler heads are installed in the center of the ceiling tile, this embodiment of the reducer clamp C and the Component Mounting System A allows the reducer clamp to be pre-centered on the mounting bar D so that the installer does not need to change the position of the reducer clamp on the mounting bar for installation of the sprinkler head.

Alternatively, if the reducer clamp C needs to be positioned somewhere other than the center of the ceiling tile, then the installer can readily slide the reducer clamp along the mounting bar D by placing the gripper 12 into the closed position, thereby releasing the clamping force of the cam portion 44 against the mounting bar D and then sliding the reducer clamp along the mounting bar until the reducer clamp is in the desired position.

Installation of the reducer clamp C includes closing the gripper 12 against the reducer 21 of the sprinkler head. The clamping actuator 14, which is a screw in the present embodiment, is then turned in a manner that biases the gripper flanges 31 of the gripper 12 toward the surface of the reducer 21 until the reducer is deemed by the user to be sufficiently clamped between the gripper and the mounting tube D. It is noted that in the present embodiment, the reducer clamp C includes a slotted portion 36 portion on each of the two side flanges 16 and that the upper edges 41 of the slotted portion are lower than a top surface 42 of the mounting bar D. Thus, when the reducer 21 is positioned within the reducer clamp C and the flanges 31 of the gripper 21 are biased toward the mounting bar D, that the reducer is generally captivated between the flanges 31 and the top surface 42 of the mounting tube D.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A mounting clamp comprising:
   a body portion having a mounting attachment element in the body portion of the mounting clamp wherein the mounting attachment element is sized and configured to allow the placement of the mounting clamp upon a mounting component;
   a bracket portion generally located near a bottom end of the body portion, the bracket portion including a set of gripping edges wherein each of the set of gripping edges includes an opposing flange oriented inwardly, and wherein a material used to manufacture the body portion tends to maintain a preset dimensional gap between each edge of the set of gripping edges such that the set of gripping flanges are biased by the resilient nature of the material to return to the preset dimensional gap when the set of gripping edges are temporarily biased apart;
   a clamping plate slideably disposed on the body portion to contact a tee bulb of a tee-shaped suspended ceiling component to assist in the stabilization of the mounting clamp when mounted on the tee-shaped suspended ceiling component; and
   a clamping plate retainer that includes a fastener disposed within a slot in the clamping plate and also disposed in an aperture in the body portion, wherein the aperture is axially aligned with the slot.

2. The mounting clamp of claim 1 wherein the mounting clamp attaches to the tee bulb by lowering over the tee bulb of the suspended ceiling tee to cause the clamping plate to make contact with the tee bulb thereby causing the tee bulb to bias the clamping plate upward on the body portion, wherein continued lowering of the mounting clamp causes the set of gripping edges to move past the tee bulb until the biasing of the gripping edges forces the gripping edges against a bottom portion of the tee bulb, and wherein the clamping plate retainer is adjusted to secure the clamping plate against the top of the tee bulb to result in a substantially retained contact of the clamping plate against the top of the tee bulb.

3. The mounting clamp of claim 1 wherein the body portion is generally in the shape of a channel.

4. The mounting clamp of claim 3 wherein the clamping plate is generally in the shape of a channel.

5. The mounting clamp of claim 4 further comprising a cutout in each flange of the general channel shape of the body portion wherein the cutout is sized and configured to allow the placement of the mounting clamp upon a mounting component.

6. The mounting clamp of claim 5 wherein each of the set of gripping edges includes a flange oriented inwardly of the channel shape of the body portion.

* * * * *